Feb. 7, 1933.   O. O. RIESER   1,896,372
BATTERY BOX MOLD
Filed Dec. 2, 1927   2 Sheets-Sheet 1
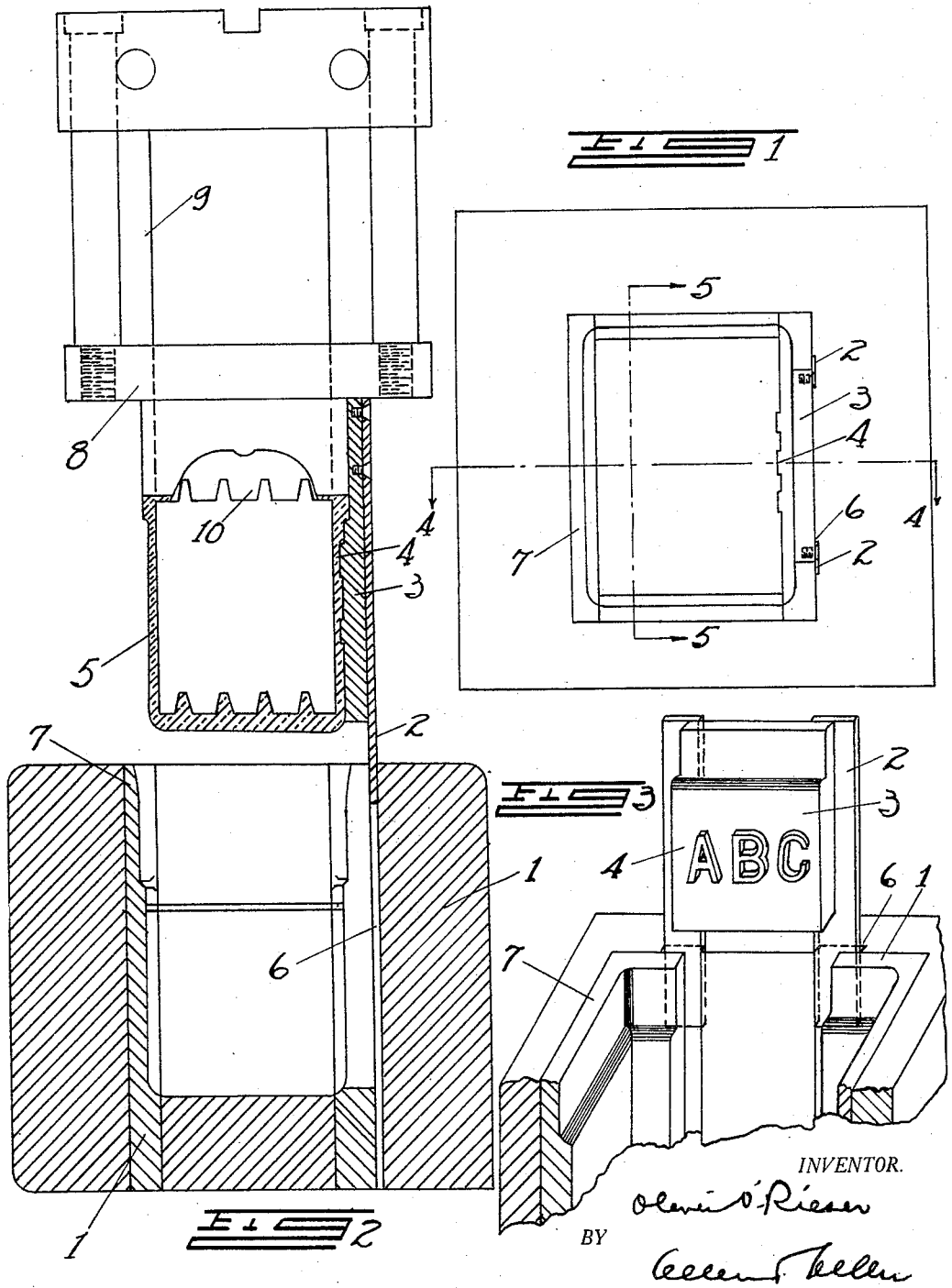
INVENTOR.
Oliver O. Rieser
BY
ATTORNEYS

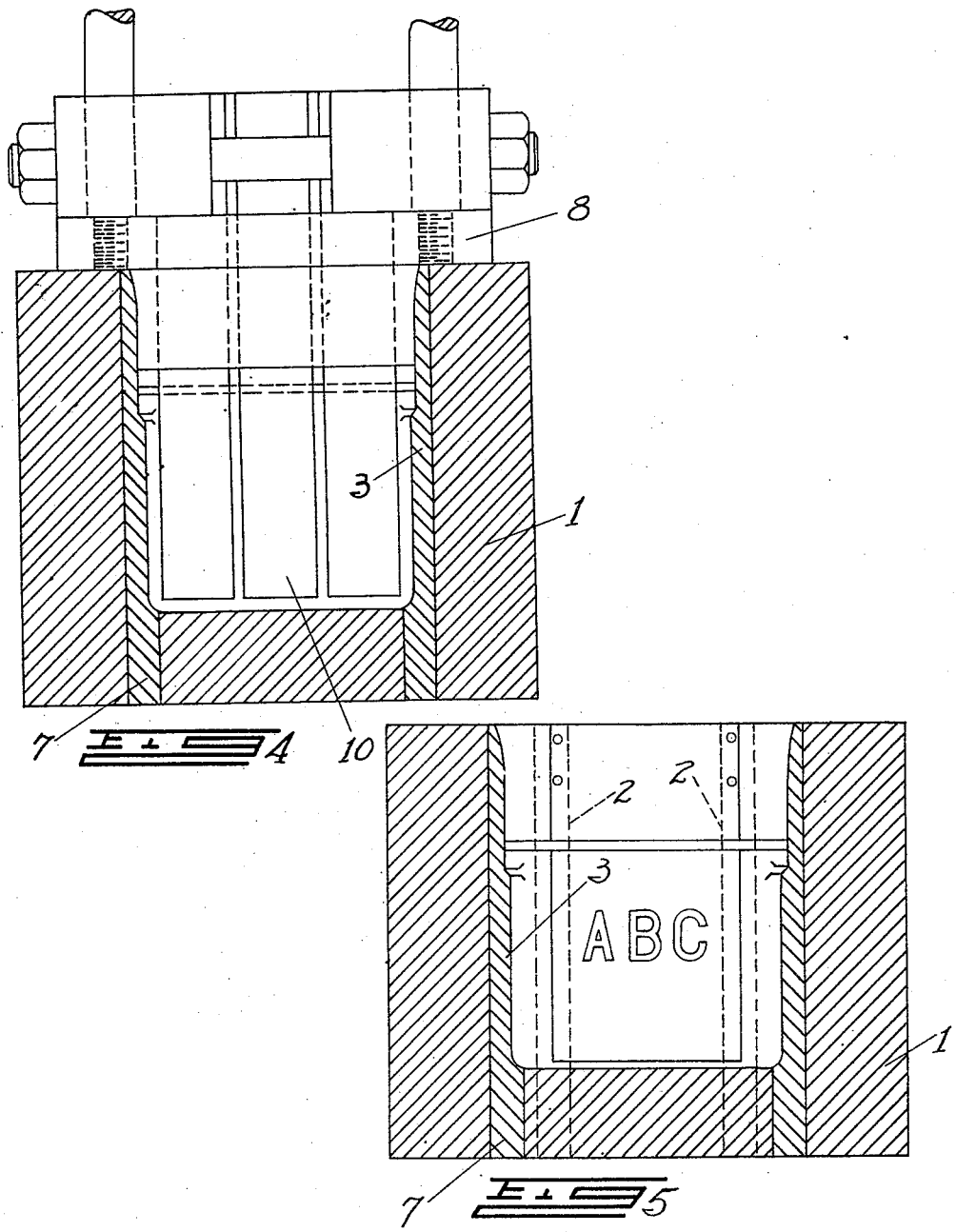

Patented Feb. 7, 1933

1,896,372

UNITED STATES PATENT OFFICE

OLIVER O. RIESER, OF OAK PARK, ILLINOIS, ASSIGNOR TO THE RICHARDSON COMPANY, OF LOCKLAND, OHIO, A CORPORATION OF OHIO

BATTERY BOX MOLD

Application filed December 2, 1927. Serial No. 237,306.

My invention relates broadly to battery box molds, and particularly to novel means associated with battery box molds for impressing name plates, trade-marks and other insignia or decorations on battery boxes during the regular molding process.

For molding battery boxes I have found that the most practical method for factory operation is to provide a female mold box having the patterns of flutes or corrugations running depthwise of the box with the bottom of the flutes open. Further ledges tapering downwardly may be impressed at the top edge of the box. I use a stripper plate which outlines the top surface of the box walls. A male mold having projections which pass through orifices in the stripper plate enters the female mold after the molding material has been inserted, and forces the molding compound firmly against the inner surface of the walls of the female mold, and against the bottom surface of the stripper plate. When the molding process is completed I withdraw both the male mold and the stripper plate together and after the stripper plate has reached a certain position, I block its further progress allowing the male mold to continue its movement. The result is that the molded box is carried on the male mold, or the projections extending from it, out of the female mold, and when the progress of the stripper plate is blocked the box is pulled away from the male mold. The female mold may then again be filled with molding material and the process repeated.

It will be apparent that such a box can only be molded as long as the patterns to be impressed on the box extend depthwise of the female mold. The embossing or impressing of any decorations such as a name plate, trade-mark or the like having laterally extending grooves or depressions, represents a difficult problem, for if there are any ridges or grooves which extend widthwise or lengthwise of the box they will prevent the upward withdrawal of the molded box from the female mold with the withdrawal of the male mold.

It is the object of my invention to provide spring plates which are slidably retained in the female mold. These plates move upward with the withdrawal of the male mold and stripper plate far enough to clear the female mold. Suitable patterns for embossing or impressing the molded box with letters or designs are carried by panels attached to the spring plates, and as the spring plates are not withdrawn from the walls of the box until the box is removed from the female mold, the plates spring away leaving a clean cut impression or raised design. It is a further object to so mount and support the auxiliary plates that they will return automatically, due to their weight, into the female mold.

The above and other objects to which reference will be made during the ensuing disclosure I accomplish by that certain arrangement and combination of parts of which I have illustrated a preferred embodiment.

In the drawings:—

Figure 1 is a plan view of the female mold or mold box for molding a battery box with the auxiliary plates in molding position, but with the stripper plate and male die removed.

Figure 2 is a vertical section through a mold box showing the female mold, the auxiliary plates, the stripper plate and the male mold.

Figure 3 is a perspective view of a female mold and box showing an auxiliary plate mounted on slidable spring plate supports.

Figure 4 is a sectional view as it would appear along the lines 4—4 in Figure 1 with the stripper plate and male mold in position.

Figure 5 is a section along the lines 5—5 of Figure 1 with the male mold removed.

The design of box for which the press illustrated is designed has only one ornamented face although all four sides of the box may be ornamented in a similar manner. I have shown the female mold 1 in which the spring plates 2, which are tensioned to spring away from the plane of a molded box, are slidably mounted. The spring plates carry the ornamenting die plate 3 having raised letters 4 on the surface which during molding will lie against the battery box wall. In Figure 2 a molded box is indicated at 5.

I have shown the spring plates mounted in dovetailed grooves 6 in a wall of the female mold. The plates which form the other walls of the box are indicated at 7, but since the invention consists primary in the provision of the auxiliary plate, it is not thought that any reference to the normal molding operation need be made. The stripper plate is indicated at 8 and the male mold plate 9 has projections 10 which extend through orifices in the stripper plate.

While in the illustration in Figure 2 the battery box indicated has been carried clear of the female mold and the plates tend to spring away at the top from the wall of the box, it will also be possible to carry the spring plates on the stripper plate, in which instance the position at which the spring plates will spring out at the bottom, as illustrated, has not yet been reached. If the spring plates and slidable molding panel is carried on the stripper plate, however, more difficulty will be experienced in aligning the plates within the grooves for the following molding operation.

While I have not described the various modifications and different designs and patterns, it will be obvious that various changes will occur to others skilled in the art without departing from the principle involved. The spring plates may have lugs on them to prevent their withdrawal from the female mold box, or they may be entirely unattached at the top and bottom. In the normal arrangement in which the plates are not attached to the stripper plate they are withdrawn by the attachment of the letters to the walls of the molded box and they spring out of the way as soon as the molded box is clear of the female mold. They will then automatically slide back into position within the female mold, and no more difficulty is experienced in molding than with a regular plain sided box. The possibility of securing different molded effects on the walls of the box, by the use of my new sliding panels, will be obvious.

Having thus described my invention, what I claim as new and desire to secure by Letters Patent, is:—

1. In combination with a female mold block with fixed molding walls, and a male mold for molding a box in said female mold, a panel for forming designs on a molded wall of a box, said panel slidable in a wall of said mold sufficiently far to permit a molded box to clear said female mold.

2. In combination with a female mold comprising fixed molding walls, and a male mold for molding a box in said female mold, a panel for forming designs on a molded wall of a box, said panel vertically slidable in a fixed wall of said mold sufficiently far as to permit a molded box to clear said female mold, said panel being of smaller size than said wall.

3. In combination with a female mold, and a male mold for molding a box in said female mold, a panel for forming designs on a molded wall of a box, said panel slidable in a wall of a mold sufficiently far as to permit a molded box to clear said female mold, said panel having a resilient mounting enabling said panel to be sprung clear of the wall of the box on which it has formed a design.

4. In combination with a female mold, and a male mold for molding a box in said female mold, a panel for forming designs on a molded wall of a box, said panel slidable in a wall of a mold sufficiently far as to permit a molded box to clear said female mold, said panel having a resilient mounting enabling said panel to be sprung clear of the wall of the box on which it has formed a design, and said resilient mounting slidable automatically back into said female mold with the release of the molded box.

5. A device for molding battery boxes comprising a female mold, a male mold for compressing molding material within said female mold, and pattern molding devices slidably retained within said female mold box, said pattern molding devices comprising a panel having a pattern to be molded on a wall of a battery box on one of its faces, and slidably mounted spring plates adapted to be sprung from the plane of walls of a molded battery box subsequent to the withdrawal of the molded battery box from the female mold, said panel being attached to said spring plates.

6. A device for molding battery boxes comprising a female mold, a male mold for compressing molding material within said female mold, and pattern molding devices slidably retained within said female mold box, said pattern molding devices comprising a panel having a pattern to be molded on a wall of a battery box on one of its faces, and slidably mounted spring plates adapted to be sprung from the plane of walls of a molded battery box subsequent to the withdrawal of the molded battery box from the female mold, said panel being attached to said spring plates, said female mold having grooves therein aligned in the direction in which a molded battery box is withdrawn, and said spring plates retained in said grooves.

7. In combination with the walls of a battery box mold, spring plates slidably mounted in a wall of said mold, and ornamenting devices attached to said spring plates.

8. Means for ornamenting the walls of a molded battery box with ornamenting insignia, such as letters, comprising in combination with fixed molding walls of a mold in which a battery box is molded, a plate carrying the letters provided with a slidable mounting so that the plate may be removed from the mold with the molded box.

9. In combination with a mold having fixed molding walls for forming an article to be stripped therefrom along an axis of the mold, means for impressing configurations therein which would normally prevent such stripping, said means comprising a molding panel sliding in one of said fixed walls so as to be stripped from said mold with said article, means defining the molding position of said panel, and means guiding the return of said panel after stripping to molding position.

10. The combination with a mold member and a core member insertible into and withdrawable from said mold member, the walls of said mold member with which the molded material contacts being rigidly united, at least one of said walls comprising in its contact face an element movable into and out of the mold in the direction of core movement, with surfaces lying across the line of said movement to form like surfaces in the molded material contacting therewith, said element being movable to withdraw said surfaces from the material upon movement out of the mold.

OLIVER O. RIESER.